US012771128B2

(12) United States Patent
Shigemori et al.

(10) Patent No.: US 12,771,128 B2
(45) Date of Patent: Oct. 20, 2026

(54) SWITCHING POWER SUPPLY CIRCUIT AND SWITCHING POWER SUPPLY SYSTEM HAVING THE SAME

(71) Applicant: TDK Corporation, Tokyo (JP)

(72) Inventors: Saiki Shigemori, Tokyo (JP); Akihiro Unno, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 18/971,175

(22) Filed: Dec. 6, 2024

(65) Prior Publication Data

US 2025/0260227 A1 Aug. 14, 2025

(30) Foreign Application Priority Data

Feb. 13, 2024 (JP) ................................ 2024-019439

(51) Int. Cl.

| | |
|---|---|
| ***H02J 1/14*** | (2026.01) |
| ***H02J 1/10*** | (2026.01) |
| ***H02M 1/00*** | (2007.01) |
| ***H02M 1/32*** | (2007.01) |
| ***H02M 3/335*** | (2006.01) |

(52) U.S. Cl.

CPC ................ *H02J 1/14* (2013.01); *H02J 1/106* (2020.01); *H02M 1/0016* (2021.05); *H02M 1/0067* (2021.05); *H02M 1/32* (2013.01); *H02M 3/33569* (2013.01)

(58) Field of Classification Search

CPC .......... H02J 1/14; H02J 1/106; H02M 1/0016; H02M 1/0067; H02M 1/32; H02M 3/33569; H02M 3/33507

USPC ........................................................... 307/82

See application file for complete search history.

(56) References Cited

U.S. PATENT DOCUMENTS

| | | | | |
|---|---|---|---|---|
| 7,542,310 | B2 | 6/2009 | Chang | |
| 8,218,339 | B2 | 7/2012 | Li et al. | |
| 9,484,820 | B2 | 11/2016 | Hyeon et al. | |
| 12,407,255 | B2 * | 9/2025 | Shigemori .......... | H02M 1/0009 |
| 2003/0128485 | A1 | 7/2003 | Matsumoto | |
| 2008/0074158 | A1 | 3/2008 | Ryu et al. | |

(Continued)

FOREIGN PATENT DOCUMENTS

| | | | |
|---|---|---|---|
| JP | 11-110056 | A | 4/1999 |
| JP | 2003-169471 | A | 6/2003 |
| JP | 2016-208688 | A | 12/2016 |

*Primary Examiner* — Rexford N Barnie
*Assistant Examiner* — Joshua James Sweet
(74) *Attorney, Agent, or Firm* — Rimon P.C.

(57) ABSTRACT

Disclosed herein is a switching power supply circuit that includes a switching circuit having an input node connected to an input power supply terminal and an output node connected to an output power supply terminal through an output switch, a feedback circuit configured to feed back information based on a voltage appearing at a control node to the switching circuit, and an activation circuit configured to turn ON the output switch after an elapse of a predetermined time after a voltage appearing at the control node exceeds a predetermined value. The switching circuit is configured to adjust a level of a voltage appearing at each of the output node and the control node based on the information to a predetermined level. The feedback circuit includes an adjustment mechanism configured to adjust a relation between a voltage appearing at the control node and the information.

11 Claims, 2 Drawing Sheets

(56) References Cited

U.S. PATENT DOCUMENTS

| | | | | |
|---|---|---|---|---|
| 2016/0352123 | A1 | 12/2016 | Konishi et al. | |
| 2017/0123445 | A1* | 5/2017 | Muccini | G06F 1/26 |
| 2018/0205320 | A1* | 7/2018 | Galloway | H02M 3/33523 |
| 2019/0103816 | A1* | 4/2019 | Ko | H02M 1/32 |
| 2023/0006460 | A1* | 1/2023 | Jiang | H02J 7/00034 |
| 2023/0253871 | A1* | 8/2023 | Sugawara | H02M 3/33571 363/21.02 |
| 2023/0402930 | A1* | 12/2023 | Corry | H02M 1/327 |

* cited by examiner

SWITCHING POWER SUPPLY CIRCUIT AND SWITCHING POWER SUPPLY SYSTEM HAVING THE SAME

CROSS-REFERENCE TO RELATED APPLICATION

This application claims the benefit of Japanese Patent Application No. 2024-019439, filed on Feb. 13, 2024, the entire disclosure of which is incorporated by reference herein.

BACKGROUND OF THE ART

Field of the Art

The present disclosure relates to a switching power supply circuit and, more particularly, to a switching power supply circuit suitably constituting a switching power supply system by being parallel-connected to one or more other switching power supply circuits.

Description of Related Art

JP 2003-169471A discloses a switching power supply system constituted by a plurality of parallel-connected switching power supply circuits. The switching power supply system disclosed in JP 2003-169471A makes reactivation timing coincident among the plurality of switching power supply circuits by mutually short-circuiting on/off control terminals of PWM control ICs included in the respective switching power supply circuits.

However, when there is a difference in output voltage among a plurality of parallel-connected switching power supply circuits, a switching power supply circuit having a higher output voltage may be put into an overcurrent state or an overload state. Thus, in the switching power supply system described in JP 2003-169471A, even when the switching power supply circuits are reactivated simultaneously, the overcurrent or overload may occur in the switching power supply circuit having a higher output voltage to result in an immediate stop of switching operation.

SUMMARY

It is therefore an object of the present disclosure to provide a switching power supply circuit that can operate stably even when connected in parallel, and a switching power supply system using the same.

A switching power supply circuit according to the present disclosure includes a switching circuit whose input node is connected to an input power supply terminal and whose output node is connected to an output power supply terminal through an output switch, a feedback circuit that feeds back information based on a voltage appearing at a control node provided in parallel with the output node to the switching circuit, and an activation circuit that turns ON the output switch after the elapse of a predetermined time after a voltage appearing at the control node exceeds a predetermined value. The switching circuit adjusts the level of a voltage appearing at each of the output node and the control node based on the feedback information to a predetermined level, and the feedback circuit includes an adjustment mechanism that can adjust the relation between a voltage appearing at the control node and the feedback information.

BRIEF DESCRIPTION OF THE DRAWINGS

The above features and advantages of the present disclosure will be more apparent from the following description of certain preferred embodiments taken in conjunction with the accompanying drawings, in which.

DETAILED DESCRIPTION OF THE EMBODIMENTS

Preferred embodiments of the present disclosure will be explained below in detail with reference to the accompanying drawings.

Figure 1:
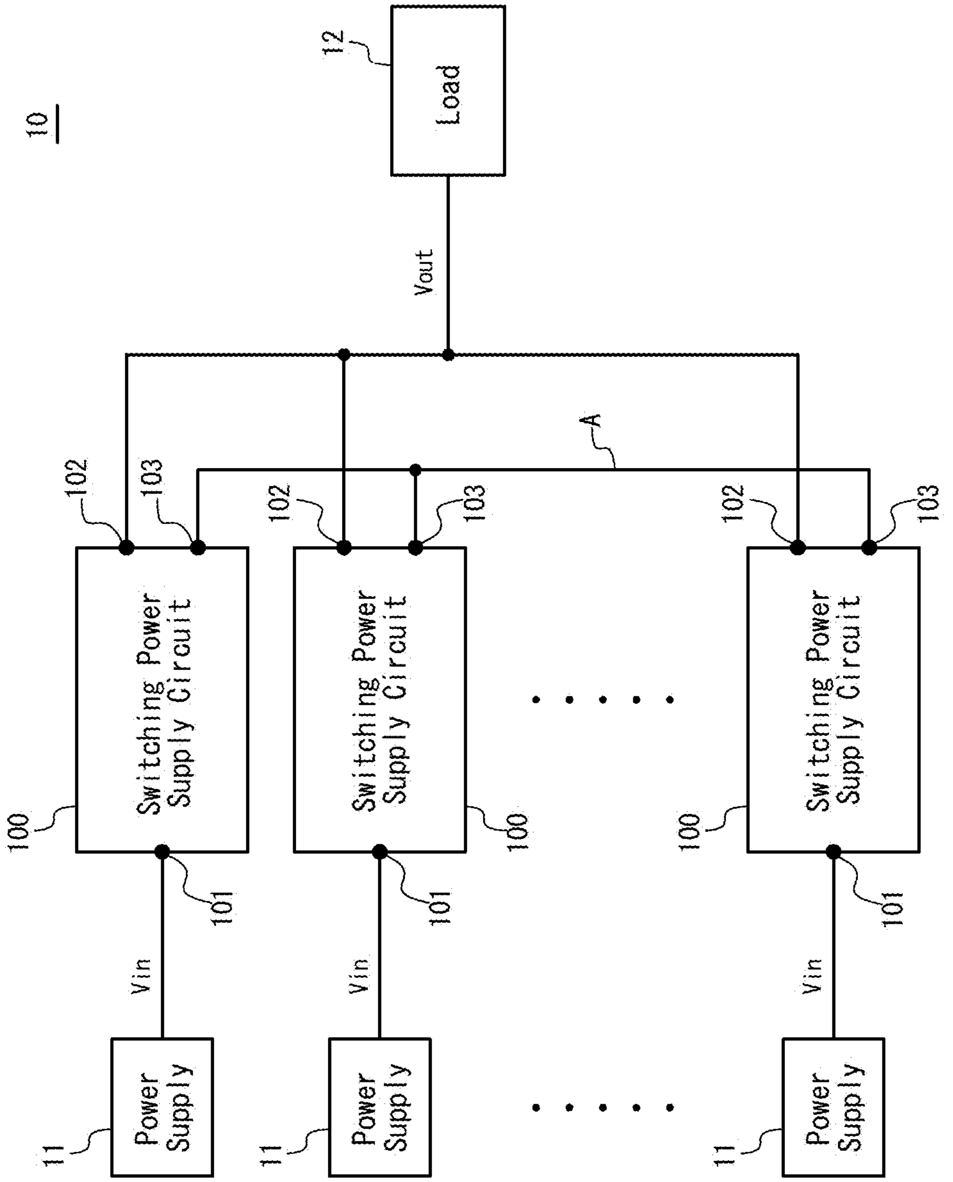
FIG. 1 is a block diagram for explaining the configuration of a switching power supply system 10 according to an embodiment of the present disclosure.

FIG. 1 is a block diagram for explaining the configuration of a switching power supply system 10 according to an embodiment of the present disclosure.

As illustrated in FIG. 1, the switching power supply system 10 according to the present embodiment has a plurality of parallel-connected switching power supply circuits 100. The switching power supply circuits 100 each have an input power supply terminal 101 which is supplied with an input voltage Vin, an output power supply terminal 102 which outputs an output voltage Vout, and an activation control terminal 103. The output power supply terminals 102 included in the respective switching power supply circuits 100 are mutually short-circuited and connected in common to a load 12. The input power supply terminals 101 included in the respective switching power supply circuits 100 are connected to different power supplies 11. The power supply 11 may be a power pickup transformer that picks up power by utilizing a magnetic field generated around a high-voltage transmission line. The activation control terminals 103 included in the respective switching power supply circuits 100 are also mutually short-circuited.

Figure 2:
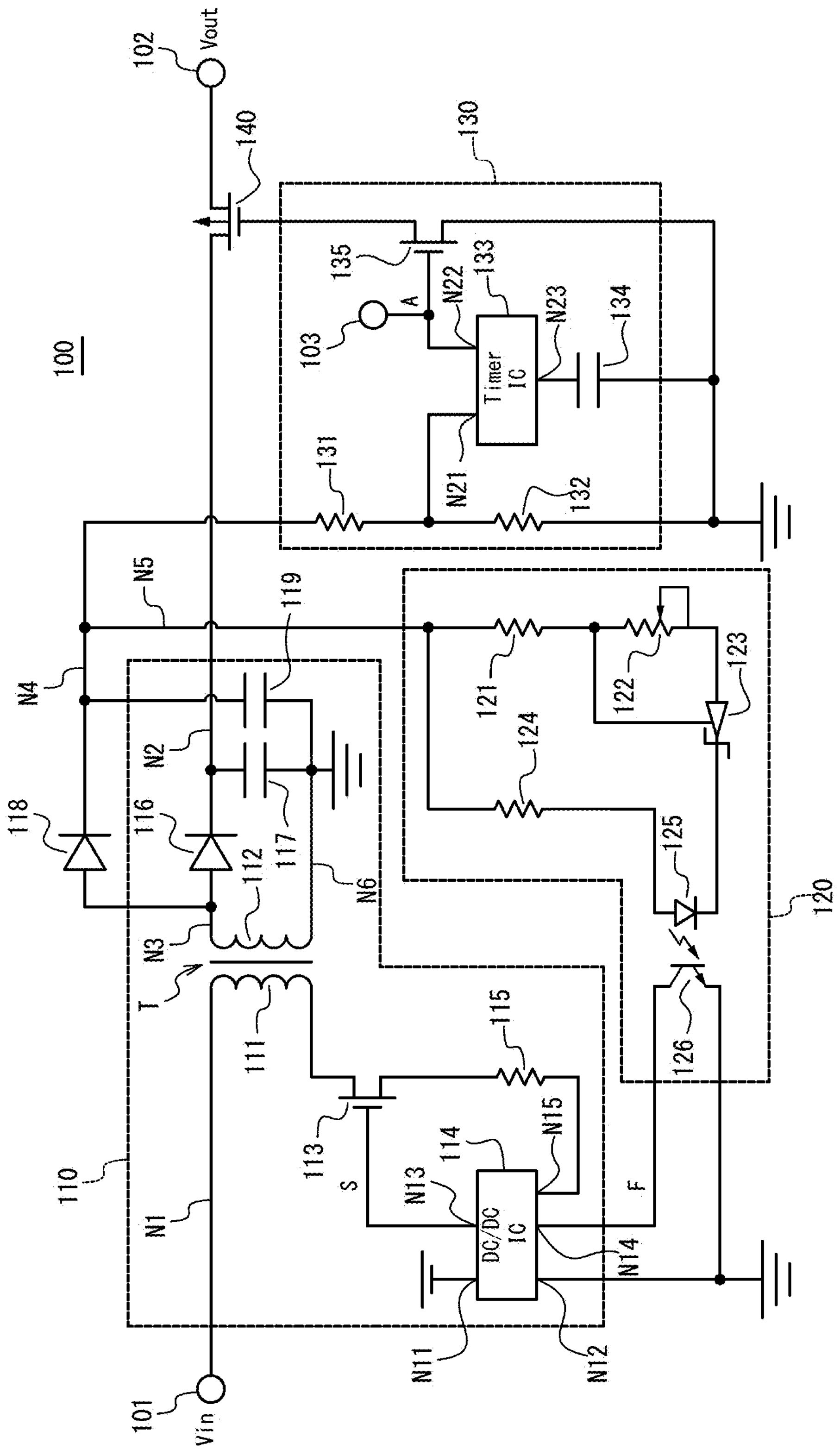
FIG. 2 is a circuit diagram of the switching power supply circuit 100.

FIG. 2 is a circuit diagram of the switching power supply circuit 100.

As illustrated in FIG. 2, the switching power supply circuit 100 includes a switching circuit 110, a feedback circuit 120, an activation circuit 130, and an output switch 140. The switching circuit 110 includes a transformer T including a primary winding 111 and a secondary winding 112, a switching element 113 connected to one end of the primary winding 111, and a switching control circuit 114 for controlling the switching element 113. The other end of the primary winding 111 constitutes an input node N1 of the switching circuit 110 and is connected to the input power supply terminal 101. An output node N3, which is one end of the secondary winding 112, is connected to an output node N2 via a diode 116 (first diode) and is also connected to a control node N4 via a diode 118 (second diode). The output node N2 is connected to the output power supply terminal 102 through the output switch 140. The other end of the secondary winding 112 is connected to ground via a ground node N6. The output node N2 is connected to the ground node N6 via a capacitor 117 (first capacitor). The activation circuit 130 is connected to the control node N4 provided in parallel with the output node N2. The control node N4 is connected to the ground node N6 via a capacitor 119 (second capacitor).

The characteristics of the diode 118 may be the same as or different from those of the diode 116. For example, the maximum rating of the diode 118 may be smaller than that of the diode 116. The characteristics of the capacitor 119 may be the same as or different from those of the capacitor 117. For example, the capacitance of the capacitor 119 may be smaller than that of the capacitor 117. An electrolytic capacitor may be used for the capacitor 117 and a multilayer ceramic capacitor may be used for the capacitor 119.

The switching control circuit 114 is constituted by, e.g., a controller IC and has a power supply node N11, a ground node N12, a control node N13, and feedback nodes N14 and N15. The switching control circuit 114 operates with a voltage supplied between the power supply node N11 and the ground node N12 and controls, based on feedback information F supplied to the feedback node N14, the frequency and duty of a switching signal S output from the control node N13 to adjust a voltage appearing at the output node N2 to a predetermined level. The switching element 113 supplied with the switching signal S is constituted by, e.g., an N-channel MOS transistor.

A current flowing in the switching element 113 is supplied to the feedback node N15 of the switching control circuit 114 through a resistor 115. The switching control circuit 114 monitors the current supplied to the feedback node N15. When determining that the current flowing in the switching element 113 is an overcurrent, the switching control circuit 114 fixes the level of the switching signal S to an inactive level (e.g., a ground level) to stop the switching operation of the switching element 113. This can prevent breakage of the switching element 113 due to an overcurrent. Similarly, also when determining that the feedback information F indicates an overload state, the switching control circuit 114 fixes the level of the switching signal S to an inactive level to stop the switching operation of the switching element 113. The switching control circuit 114 is reactivated after the switching operation is stopped, and the switching operation is resumed after the elapse of a predetermined time.

The feedback circuit 120 generates feedback information F based on a voltage appearing at the control node N4 provided in parallel with the output node N2 and feeds back the feedback information to the switching circuit 110. Voltages appearing at the output node N2 and the control node N4 substantially coincide with the output voltage Vout when the output switch 140 is ON. The feedback circuit 120 includes fixed resistors 121 and 124, a variable resistor 122, a shunt regulator 123, a photodiode 125, and a phototransistor 126. The fixed resistor 121 and the variable resistor 122 are connected in series between the control node N4 and the anode of the shunt regulator 123 to constitute a voltage divider circuit, and a voltage at a connection point therebetween is supplied to the reference node of the shunt regulator 123. The fixed resistor 124 and the photodiode 125 are connected in series between the control node N4 and the cathode of the shunt regulator 123. The photodiode 125 and phototransistor 126 constitute a photocoupler and act to transmit the feedback information F from the secondary side to primary side while maintaining insulation between the primary and secondary sides.

The level of the feedback information F varies depending not only on a voltage appearing at the control node N4 equivalent to a voltage appearing at the output node N2 but also on the dividing ratio of the voltage divider circuit constituted by the fixed resistor 121 and variable resistor 122. At the design stage, the dividing ratio of the voltage divider circuit is set such that a voltage appearing at the output node N2 has a predetermined level (e.g., 24 V); however, the level of a voltage actually appearing at the output node N2 may deviate from the predetermined level due to individual difference ascribable to manufacturing variations. The variable resistor 122 serves as an adjustment mechanism to eliminate such a deviation. By adjusting the resistance value of the variable resistor 122, the relation between a voltage appearing at the control node N4 and the feedback information F is finely adjusted after manufacturing, whereby the level of a voltage appearing at the output node N2 is adjusted to a predetermined level (e.g., 24 V).

The activation circuit 130 includes fixed resistors 131, 132, a timer IC 133, a capacitor 134, and an N-channel MOS transistor 135. The fixed resistors 131 and 132 are connected in series between the control node N4 and the ground to constitute a voltage divider circuit, and a voltage at a connection point therebetween is supplied to an input node N21 of the timer IC 133. The timer IC 133 outputs an activation signal A of a high level from an output node N22 after the elapse of a predetermined time from when the voltage supplied to the input node N21 exceeds a predetermined value. The activation signal A is supplied to the gate electrode of the transistor 135. The transistor 135 is connected between the gate electrode of the output switch 140 constituted by a P-channel MOS transistor and the ground. Thus, when the activation signal A is activated to a high level, the gate electrode of the P-channel MOS transistor constituting the output switch 140 is grounded to turn ON the output switch 140. That is, the output switch 140 is turned ON after the elapse of a predetermined time from when a voltage appearing at the control node N4 exceeds a predetermined value. Meanwhile, the predetermined time counted by the timer IC 133 can be adjusted by the capacitance of the capacitor 134 connected to an adjustment node N23.

The activation signal A is supplied also to the activation control terminal 103. As described above, the activation control terminals 103 are connected in common among the plurality of switching power supply circuits 100 and, accordingly, after activation of the switching circuits 110 included in the plurality of respective switching power supply circuits 100, the activation signal A that has been activated earliest is supplied in common to the switching power supply circuits 100 through the corresponding activation control terminals 103. As a result, the output switches 140 included in the respective switching power supply circuits 100 are turned ON substantially simultaneously. Although the activation signal A indirectly controls the output switch 140 through the transistor 135 in the example illustrated in FIG. 2, it may directly control the output switch 140.

By parallel-connecting the thus configured switching power supply circuits 100 as illustrated in FIG. 1, the switching power supply system 10 according to the present disclosure can be constituted. In this configuration, the output voltage levels of the respective switching power supply circuits 100 can be made to substantially coincide with one another by adjusting the resistance values of the variable resistors 122, thus preventing a specific switching power supply circuit 100 from being put into an overload state.

When an overcurrent or an overload occurs in a certain switching power supply circuit 100, switching operation is stopped in this switching power supply circuit 100, and the output voltage Vout therefrom becomes 0 V. As a result, an overcurrent or an overload occurs also in the remaining switching power supply circuits 100 and, eventually, switching operation is stopped in all the switching power supply circuits 100. Thereafter, in each switching power supply circuit 100, the switching control circuit 114 is reactivated to raise the voltage of the output node N2. Then, the activation signal A is activated in the switching power supply circuit 100 in which the voltage of the output node N2 reaches a predetermined value earliest, and this activation signal A is supplied to the other switching power supply circuits 100, whereby all the switching power supply circuits 100 start power output substantially simultaneously. This prevents a specific switching power supply circuit 100 from being put into an overcurrent or an overload state upon the activation.

In the example illustrated in FIG. 1, the switching power supply circuits 100 are connected to different power supplies 11, so that the levels of the input voltages Vin input to the respective switching power supply circuits 100 do not always coincide with one another. Even under such a condition, according to the switching power supply system 10 of the present embodiment, the levels of the output voltages Vout from the respective switching power supply circuits 100 substantially coincide with one another, thus preventing a specific switching power supply circuit 100 from being put into an overload state.

The output node N3 is one end of the secondary winding 112 of the transformer T, i.e., the anode of the diode 116. The level of the output node N3 is higher than the voltage level of the output node N2 by the forward direction voltage of the diode 116, and higher than the voltage level of the control node N4 by the forward direction voltage of the diode 118. However, since the levels of the output node N2 and the control node N4 are almost linked to the level of the output node N3, the control node N4 and the output node N2 can be considered to be almost the same as each other with respect to the operation of the feedback circuit 120 and the activation circuit 130. For this reason, the activation circuit 130 may be connected to the control node N4.

In this embodiment, the input node N5 of the feedback circuit 120 is connected to the control node N4 connected to the activation circuit 130, rather than to the output node N2 connected to the output power supply terminal 102 via the output switch 140. By connecting the input node N5 of the feedback circuit 120 to the control node N4, the output voltage Vout can be correctly read without being affected by the load 12 connected to the output power supply terminal 102, and a specified voltage can be output even if there is no load.

In principle, it is desirable to read the feedback information F from the output node N2. If the feedback information F is read from the control node N4, the loss of the diode 116 is not taken into consideration, and the output voltage level of each switching power supply circuit 100 may vary due to the influence of individual differences in the diode 116, which may result in unstable operation during parallel operation. However, the output voltage level of the switching power supply circuit 100 is adjusted by adjusting the variable resistor 122 while monitoring the output voltage Vout appearing at the output power supply terminal 102, and the adjustment result is also reflected in the output node N2. Therefore, there is no problem in referring to the voltage of the control node N4 as the feedback information F.

Malfunction of the feedback circuit 120 caused by reading a voltage flowing back from another switching power supply circuit 100 during parallel operation can be prevented by inserting a diode between the output switch 140 and the output power supply terminal 102. However, in this embodiment, it is not necessary to use such a diode, which is advantageous in terms of component cost, output efficiency, board size, and the like.

While the preferred embodiment of the present disclosure has been described, the present disclosure is not limited to the above embodiment, and various modifications may be made within the scope of the present disclosure, and all such modifications are included in the present disclosure.

The technology according to the present disclosure includes the following configuration examples but not limited thereto.

A switching power supply circuit according to the present disclosure includes a switching circuit whose input node is connected to an input power supply terminal and whose output node is connected to an output power supply terminal through an output switch, a feedback circuit that feeds back information based on a voltage appearing at a control node provided in parallel with the output node to the switching circuit, and an activation circuit that turns ON the output switch after the elapse of a predetermined time after a voltage appearing at the control node exceeds a predetermined value. The switching circuit adjusts the level of a voltage appearing at each of the output node and the control node based on the feedback information to a predetermined level, and the feedback circuit includes an adjustment mechanism that can adjust the relation between a voltage appearing at the control node and the feedback information.

According to the present disclosure, using the adjustment mechanism that can adjust the relation between a voltage appearing at the control node provided in parallel with the output node and the feedback information allows adjustment of the level of an output voltage output from the output power supply terminal. Thus, in a case where a plurality of switching power supply circuits are parallel-connected to constitute a switching power supply system, it is possible to prevent a specific switching power supply circuit from being preferentially put into an overcurrent state or an overload state.

In the present disclosure, the feedback circuit may include a voltage divider circuit that divides a voltage appearing at the control node, and the adjustment mechanism may be constituted by a variable resistor included in the voltage divider circuit. With this configuration, it is possible to easily adjust the level of an output voltage.

In the present disclosure, the switching circuit may include a transformer including a primary winding connected to the input node and a secondary winding connected to the output node and the control node, a switching element connected to the primary winding, and a switching control circuit that controls the switching element. The switching control circuit may stop the switching operation of the switching element when determining that a current flowing in the switching element is an overcurrent. This can eliminate an overcurrent state.

In the present disclosure, the switching control circuit may stop the switching operation of the switching element when determining that the feedback information indicates an overload state. This can eliminate an overload state.

In the present disclosure, one end of the secondary winding may be connected to the output node via a first diode and to the control node via a second diode, another end of the secondary winding may be grounded, the output node may be grounded via a first capacitor, and the control node may be grounded via a second capacitor. In this case, the maximum rating of the second diode may be smaller than that of the first diode, and the capacitance of the second capacitor may be smaller than that of the first capacitor. With this configuration, a specified voltage can be stably output from the output power supply terminal regardless of the size of the load connected to the output power supply terminal.

A switching power supply system according to the present disclosure includes a plurality of the above-described switching power supply circuits, wherein the output power supply terminals included in the plurality of respective switching power supply circuits are mutually short-circuited, the activation circuits included in the plurality of respective switching power supply circuits each include an activation control terminal that directly or indirectly controls the output switch, and the activation control terminals included in the plurality of respective switching power supply circuits are mutually short-circuited. With this configuration, it is possible to reactivate the plurality of switching power supply circuits simultaneously.

The switching power supply system according to the present disclosure may further include a plurality of power supplies connected respectively to the input power supply terminals included in the plurality of respective switching power supply circuits. With this configuration, even when there is a difference among the levels of input voltages supplied from the plurality of respective power supplies, it is possible to prevent a specific switching power supply circuit from being preferentially put into an overcurrent state or an overload state.

As described above, according to the present disclosure, there can be provided a switching power supply circuit that can operate stably even when connected in parallel, and a switching power supply system using the same.

What is claimed is:

1. A switching power supply circuit comprising:
- a switching circuit having an input node connected to an input power supply terminal and an output node connected to an output power supply terminal through an output switch;
- a feedback circuit configured to feed back information based on a voltage appearing at a control node provided in parallel with the output node to the switching circuit; and
- an activation circuit configured to turn ON the output switch after an elapse of a predetermined time after a voltage appearing at the control node exceeds a predetermined value,
- wherein the switching circuit is configured to adjust, based on the information, respective levels of voltages appearing at the output node and the control node to predetermined levels,
- wherein the feedback circuit includes an adjustment mechanism configured to adjust a relation between a voltage appearing at the control node and the information,
- wherein the switching circuit includes a transformer having a primary winding connected to the input node and a secondary winding connected to the output node and the control node, and
- wherein one end of the secondary winding is connected to the output node via a first diode and to the control node via a second diode.

2. The switching power supply circuit as claimed in claim 1,
- wherein the feedback circuit includes a voltage divider circuit configured to divide a voltage appearing at the control node, and
- wherein the adjustment mechanism has a variable resistor included in the voltage divider circuit.

3. The switching power supply circuit as claimed in claim 1,
- wherein the switching circuit further includes:
  - a switching element connected to the primary winding; and
  - a switching control circuit configured to control the switching element, and
- wherein the switching control circuit is configured to stop a switching operation of the switching element when a current flowing in the switching element is an overcurrent.

4. The switching power supply circuit as claimed in claim 3, wherein the switching control circuit is configured to stop the switching operation of the switching element when the information indicates an overload state.

5. The switching power supply circuit as claimed in claim 3,
- wherein another end of the secondary winding is grounded,
- wherein the output node is grounded via a first capacitor, and
- wherein the control node is grounded via a second capacitor.

6. A switching power supply system comprising a plurality of switching power supply circuits,
- wherein each of the plurality of switching power supply circuits includes:
  - a switching circuit having an input node connected to an input power supply terminal and an output node connected to an output power supply terminal through an output switch;
  - a feedback circuit configured to feed back information based on a voltage appearing at a control node provided in parallel with the output node to the switching circuit; and
  - an activation circuit configured to turn ON the output switch after an elapse of a predetermined time after a voltage appearing at the control node exceeds a predetermined value,
- wherein the switching circuit is configured to adjust, based on the information, respective levels of voltages appearing at the output node and the control node to predetermined levels,
- wherein the feedback circuit includes an adjustment mechanism configured to adjust a relation between a voltage appearing at the control node and the information,
- wherein the switching circuit includes a transformer having a primary winding connected to the input node and a secondary winding connected to the output node and the control node,
- wherein one end of the secondary winding is connected to the output node via a first diode and to the control node via a second diode,
- wherein the activation circuit includes an activation control terminal configured to control the output switch,
- wherein the output power supply terminals included in the plurality of switching power supply circuits are mutually short-circuited, and
- wherein the activation control terminals included in the plurality of switching power supply circuits are mutually short-circuited.

7. The switching power supply system as claimed in claim 6, further comprising a plurality of power supplies each connected to the input power supply terminal included in an associated one of the plurality of switching power supply circuits.

8. The switching power supply system as claimed in claim 6,
- wherein the feedback circuit includes a voltage divider circuit configured to divide a voltage appearing at the control node, and
- wherein the adjustment mechanism has a variable resistor included in the voltage divider circuit.

9. The switching power supply system as claimed in claim 6, wherein the switching circuit further includes:

a switching element connected to the primary winding; and a switching control circuit configured to control the switching element, and wherein the switching control circuit is configured to stop a switching operation of the switching element when a current flowing in the switching element is an overcurrent.

10. The switching power supply system as claimed in claim 9, wherein the switching control circuit is configured to stop the switching operation of the switching element when the information indicates an overload state.

11. The switching power supply system as claimed in claim 9, wherein another end of the secondary winding is grounded, wherein the output node is grounded via a first capacitor, and wherein the control node is grounded via a second capacitor.

* * * * *